United States Patent Office 2,716,610
Patented Aug. 30, 1955

2,716,610

AUTOMOBILE POLISH COMPOSITIONS

Dominick Russo and Henry H. Cooke, Elizabeth, N. J., assignors to Esso Research and Engineering Company, a corporation of Delaware No Drawing. Application January 26, 1951,
Serial No. 208,077

2 Claims. (Cl. 106—3)

This invention relates to improved oily compositions having decreased foaming properties. More particularly, it relates to oily compositions and oily aqueous emulsions of reduced foaming properties containing emulsifying agents which normally cause excessive foam and small amounts of specific petroleum sulfonates which satisfactorily function to reduce this undesirable foaming.

Non-aqueous oily emulsion concentrates and many oil-in-water aqueous emulsion compositions both conventionally contain water-soluble emulsifying agents which often cause excessive foaming. The foam gives trouble in the manufacturing and packaging operations. In some cases, the volume of foam will increase the volume of the batch 50 to 100% making it necessary to reduce the batch size considerably below the rated capacity of the mixing tanks. When such foamy products are filled by automatic machinery, it is difficult to get the proper weight or volume into the container. This applies particularly to aqueous emulsion polishes, such as auto polishes and furniture polishes.

Excessive foaming also occurs in non-aqueous systems such as insecticidal emulsion concentrates which are shipped to the field and there diluted with water to form an emulsion. The concentrates usually consist of an aromatic hydrocarbon oil base containing in solution an organic insecticide and a water-soluble emulsifier. Unless a foam inhibitor is used, some concentrates of this type produce a stable foam when the product is agitated or pumped. This foam may stand up for twenty-four hours or longer and interfere seriously with the blending and packaging operations.

Anti-foam agents are commonly used in both systems. They are often water-insoluble liquids which lie on the surface and suppress the foam like a blanket. Other anti-foam agents are insoluble liquids which form emulsions with the liquid to be defoamed. Higher alcohols, esters and aromatic oils have been generally used for this purpose. In recent years silicone oils and other synthetic oils have been employed because of their greater effectiveness. Silicone oils have the disadvantage of being relatively expensive.

It will be understood, therefore, that great benefits are to be obtained from an inexpensive oil-soluble anti-foaming agent.

It has now been found that incorporation of small amounts of particular petroleum sulfonates in the beforementioned compositions is ideally adapted to secure these benefits.

The particular petroleum sulfonates employed are the sodium and potassium, alkali metal, petroleum sulfonates having a molecular weight of from 400 to 600 and preferably from 450 to 600. The sodium petroleum sulfonate is particularly effective. Petroleum sulfonates having a molecular weight below the indicated range as well as those having different metallic cations are ineffective for the purpose of this invention.

It is indeed surprising to find that the particular petroleum sulfonates utilized exhibit the anti-foaming properties in view of the fact that various petroleum sulfonates are conventionally added to oily compositions as emulsifiers, a diametrically opposite purpose from that utilized in this invention. Laboratory tests prove that the indicated petroleum sulfonates are superior to antifoamants such as camphor oil, pine oil, lauryl alcohol, oleyl alcohol and tributyl citrate. The petroleum sulfonates of this invention are thus employed in the presence of, and in addition to, water-soluble emulsifying agents in the composition indicated.

The particular oil sulfonates utilized are produced by the sulfonation of relatively heavy mineral oil fractions with various sulfonating agents such as strong sulfuric acid, $SO_2$ and $SO_3$, etc., by the well-known process utilized in the petroleum refining field. The oil-soluble petroleum sulfonic acids are found in the organic layers subsequent to sulfonation and are then neutralized in situ with the alkali metal hydroxide. The alkali metal soaps are then extracted with aqueous alcohol solutions such as 50% aqueous isopropyl alcohol, 50% ethyl alcohol, etc. The neutralization can also be accomplished with caustic alkali hydroxide in 50% isopropyl alcohol. After removal of the alcohol, the oil-soluble petroleum sulfonates are obtained. They may be purified by further treatment known in the art. These sulfonates can be obtained from the sulfonation of only the proper initial feed stock or by separating the desired sulfonic acid salts from a much wider fraction.

These petroleum sulfonates may be added to the compositions in which they are to function as anti-foamants at any stage of the manufacture of the compositions, preferably early in order to achieve operating economy. They are added in an amount of 0.01 to 5 wt. per cent based on the total composition.

The particular petroleum sulfonates are thus adapted to be employed in a wide variety of compositions, all containing in common a hydrocarbon oil and a water-soluble emulsifying agent and other ingredients depending upon the particular compositions. Other additives may be present. Thus, for example, the anti-foaming properties of the petroleum sulfonate anti-foamants of this invention are particularly noticeable in aqueous oily compositions containing clays, such as bentonite, as in automobile polishes. They are also markedly efficient in insecticidal non-aqueous emulsion concentrates where the foams are created by the combined effects of the emulsifying agents and the insecticides. The insecticidal emulsion concentrates contemplated usually consist of chlorinated cyclic organic insecticides such as dichlorodiphenyl trichloroethane, dichlorodiphenyl dichloroethane, etc., organic solvents for the insecticides, usually aromatic in nature, such as aromatic kerosene, benzene, etc. (see "Soap and Sanitary Chemicals," November 1945, pages 110 et seq.).

The water-soluble emulsifying agents usually employed in making up the oily compositions are typified by the sulfates of medium chain alcohols such as up to dodecanol, sulfonated amide and ester derivatives, sulfonated aromatic and mixed alkyl-aryl sulfonate derivatives and esters of fatty acids such as the ricinoleic acid ester of sorbitol (see "Synthetic Detergents—up to date," "Soap and Sanitary Chemicals," Aug., Sept. and Oct. 1949). The non-ionic emulsifying agents such as the ethylene oxide condensation products of alkylated phenols may also be used.

Other ingredients, such as the oils present in the typical formulations in which this invention is useful, can be seen from the detailed examples of various compositions presented below.

Typical formulations and proof of the efficacy and critical nature of the particular petroleum sulfonates employed are listed in the following examples.

Example 1.—Criticality of the molecular weight of the petroleum sulfonates

A typical automobile oil polish was selected and individual laboratory batches were prepared including 0.05 wt. per cent of sodium petroleum sulfonate as an additive. The only variable in the different batches was the employment of a different molecular weight sulfonate. For control purposes, a batch was made without sulfonate. The foam testing was done according to a modified procedure adapted from ASTM method, No. D-892-46T. The results follow.

| Mol. Wt. of Sulfonate | Foam produced in milliliters | Seconds for foam to break |
|---|---|---|
| 400 | 440 | 150 |
| 453 | 200 | 75 |
| 529 | 200 | 40 |
| 570 | 125 | 20 |
| 600 | 100 | 20 |
| Control sample without sulfonate | 600 | 900 |

The typical automobile polish formula use in the foam test procedure had the following composition:

| | Per cent by wt. |
|---|---|
| Water | 74.7 |
| Emulsifying agent | 0.3 |
| Spindle oil | 11.0 |
| Bentonite | 2.0 |
| Diatomaceous earth | 12.0 |
| | 100.0 |

The results indicate quite clearly the criticality of the molecular weight of the sulfonates employed. Thus an increase in molecular weight from 400 to 453 reduced the amount of foam almost 60% and reduced the foam breaking time by 50%.

Example 2

Furniture polish: Per cent by wt.
- Oil soluble sulfonate (450–550 mol. wt.) — 0.4
- Triethanolamine — 1.2
- Isopropyl alcohol — 2.5
- Glycerine — 2.5
- Camphor oil — 5.0
- Oleic acid — 3.0
- Spindle oil — 41.0
- Water — 44.4

100.0

Example 3

Automobile polish: Per cent by wt.
- Oil soluble sulfonate (450–550 mol. wt.) — 0.1
- Camphor oil — 3.0
- Spindle oil — 8.4
- Bentonite — 2.0
- Emulsifying agent — 0.33
- Diatomaceous earth — 12.50
- Water — 73.67

100.00

Example 4

Automobile polish: Per cent by wt.
- Oil soluble sulfonate (450–550 mol. wt.) — 0.2
- Carnauba wax — 2.0
- Spindle oil — 8.0
- "A" Resin (15% solution of di-isobutylene-butadiene polymer in turpentine) — 3.0
- Diatomaceous earth — 10.0
- Water — 76.5
- Emulsifying agent — 0.3

100.0

Example 5

Emulsion concentrate: Per cent by wt.
- Oil soluble sulfonate (450–550 mol. wt.) — 0.25
- Triton B-1956 (phthalic glycerol alkyd resin) — 3.00
- Triton X-155 (dimeric alkylated arylpolyether alcohol) — 2.00
- DDT (dichlorodiphenyl trichloroethane) — 30.00
- Aromatic hydrocarbon solvent — 64.75

100.00

Example 6

Emulsion concentrate: Per cent by wt.
- Oil soluble sulfonate (450–550 mol. wt.) — 0.5
- Triton B-1956 (phthalic glycerol alkyd resin) — 3.0
- Triton X-155 (dimeric alkylated aryl polyether alcohol) — 2.0
- Rhothane D-3 (dichlorodiphenyl dichloroethane) — 30.0
- Aromatic hydrocarbon solvent — 64.5

100.0

Example 7

Automobile polish: Per cent by wt.
- Oil soluble sulfonate (550–600 mol. wt.) — 0.05
- Spindle oil — 11.00
- Emulsifying agent — 0.30
- Bentonite — 2.00
- Diatomaceous earth — 12.00
- Water — 74.65

100.00

Resins may be employed instead of waxes in the polishing compositions.

It is to be understood that the invention is not limited to the specific examples which have been offered merely as illustrations, and that modifications may be made without departing from the spirit of the invention.

What is claimed is:

1. An automobile polish having approximately the following weight per cent composition:

| | |
|---|---|
| Oil soluble petroleum sulfonate (450–550 mol. wt.) of a metal selected from the group consisting of sodium and potassium | 0.1 |
| Camphor oil | 3.0 |
| Spindle oil | 8.4 |
| Bentonite | 2.0 |
| Water-soluble emulsifying agent selected from the group consisting of medium chain alcohol sulfates, sulfonated ester derivatives, and sulfonated aromatic derivatives | 0.33 |
| Diatomaceous earth | 12.50 |
| Water | 73.67 |
| | 100.00 |

2. A polish according to claim 1 wherein the emulsifying agent is dodecanol sulfate.

References Cited in the file of this patent

UNITED STATES PATENTS

| | | |
|---|---|---|
| 1,964,641 | Mathias | June 26, 1934 |
| 1,986,936 | Lewers | Jan. 8, 1935 |
| 2,134,158 | Volck | Oct. 25, 1938 |
| 2,141,729 | Thompsin | Dec. 27, 1938 |
| 2,216,485 | Brandt | Oct. 1, 1940 |
| 2,285,940 | Norring | June 9, 1942 |
| 2,426,088 | Filbert | Aug. 19, 1947 |
| 2,540,437 | Fuchs | Feb. 6, 1951 |
| 2,545,677 | Sperry | Mar. 20, 1951 |

OTHER REFERENCES

Jones et al.: Journal of Economic Entomology, vol. 39, No. 6, December 1946, pages 735–740.